United States Patent [19]
Say

[11] Patent Number: 5,533,238
[45] Date of Patent: Jul. 9, 1996

[54] BREAKAWAY CORD CONNECTOR

[76] Inventor: James Say, 83 Swan Dr., Breckenridge, Colo. 80424

[21] Appl. No.: 331,695

[22] Filed: Oct. 31, 1994

[51] Int. Cl.$^6$ .................................................. F16G 11/00
[52] U.S. Cl. ...................... 24/115 F; 24/115 M; 24/575; 24/598.4
[58] Field of Search ............................ 24/115 F, 115 G, 24/115 M, 133, 134 L, 134 KA, 129 R, 575, 579.1, 684, 640, 602, 3.4

[56] References Cited

U.S. PATENT DOCUMENTS

| | | | |
|---|---|---|---|
| 2,356,715 | 8/1944 | Webster | 24/598.4 |
| 2,612,139 | 9/1952 | Collins | 24/684 |
| 2,738,477 | 3/1956 | Matthysse | 24/575 |
| 3,520,033 | 7/1970 | Usuda | 24/575 |
| 4,477,947 | 10/1984 | Lyons . | |
| 4,688,961 | 8/1987 | Shioda et al. | 24/575 |
| 4,909,298 | 3/1990 | Langhart et al. . | |
| 4,944,074 | 7/1990 | Bullet et al. . | |
| 4,959,891 | 10/1990 | Chou . | |
| 5,027,477 | 7/1991 | Seron . | |
| 5,201,858 | 4/1993 | Ortrusina . | |

*Primary Examiner*—Victor N. Sakran
*Attorney, Agent, or Firm*—Rick Martin

[57] ABSTRACT

A breakaway cord connector is made from two identical cord connector bodies, each about ¾ inch long. Each body has a cord end clamp and a mating end. The mating end fits into the identical mating end of the opposite unit at a 180° out of phase relationship. The units remain axially aligned and form a torpedo-like smooth assembly that can slide down garment hems or avoid catching on hazardous objects. The mating ends breakaway at a preset tension, thereby preventing injuries.

18 Claims, 4 Drawing Sheets

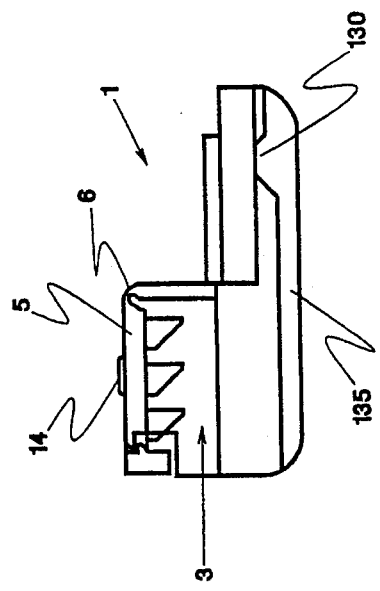
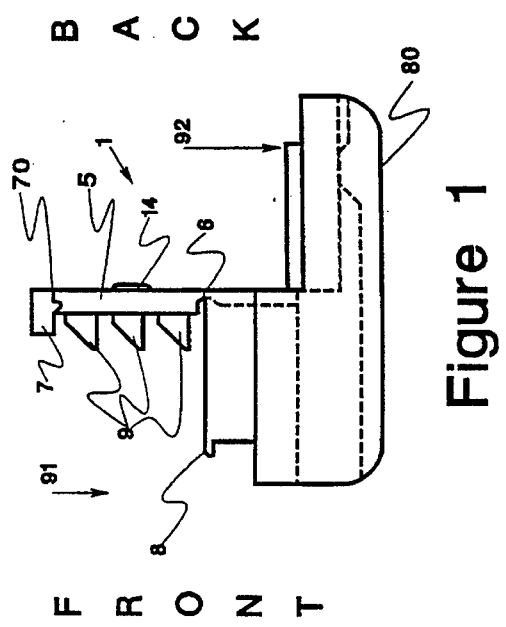
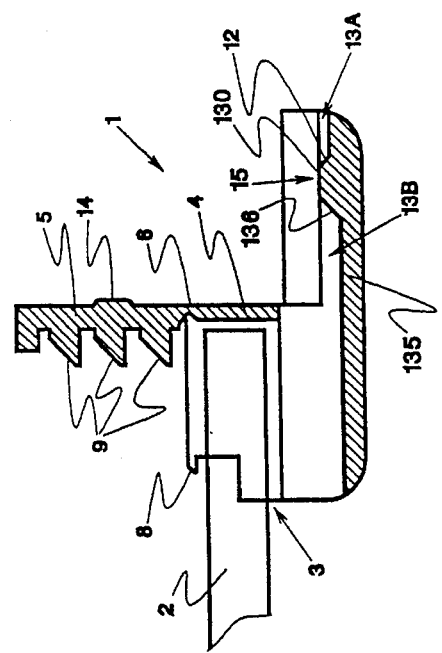

5,533,238

BREAKAWAY CORD CONNECTOR

FIELD OF INVENTION

The present invention relates to a safety link for a thin cord, which could be used as a drawstring closure, sunglass retainer, ski pass holder, and the like. The safety link releases at a preset tension, thereby preventing injuries.

BACKGROUND OF THE INVENTION

Sweatshirt hood drawstrings and any cord draped around the neck can cause injury and/or death if accidentally ensnared. Ski lifts, playground equipment or amusement rides are all potentially lethal if a drawstring becomes entangled in them. Movement is underway to legislate a law to mandate breakaway links in all drawstrings worn about the neck.

Even without a law, common sense tells us that an inexpensive and unobtrusive breakaway link is desirous for any cord draped around the neck. The below listed patents disclose related efforts to add a safety link to a cord.

U.S. Pat. No. 4,477,947 (1984) to Lyons discloses a pair of symmetrical cord safety releases. The pair is joined together by a dovetail joint. A hinged lever has gripping teeth to secure the cord. The levers can be opened to enable pulling the cord tight.

U.S. Pat. No. 4,909,298 (1990) to Langhart et al. discloses a safety pull cord for windows. A hand held pull assembly breaks in half if a child accidentally tries to strangle himself. The device would not function as a safety cord device because a 180° pulling of the cords cannot be done without separating the halves.

U.S. Pat. No. 4,944,074 (1990) to Bullat et al. discloses a cord safety release mechanism having a ball encased in a slitted cylindrical-shaped spring housing member. The spring housing spreads at a preset limit, thereby releasing the ball. The cord must be knotted to a loop on the ball.

U.S. Pat. No. 4,959,891 (1990) to Chou discloses a tough, but removable, connection of a flat strap to a hook. No quick release safety features are included.

U.S. Pat. No. 5,027,477 (1991) to Seron discloses a breakaway necklace. A flat female clip mates with a pair of plastic fingers to provide a preset release mechanism.

U.S. Pat. No. 5,201,858 (1993) to Otrusina discloses a male/female locking pair for joining a pager and the like to a belt.

The '947 patent is the closest known prior art. Dovetail connections hold a pair of fastener parts together. The dovetail connections break away at a safe tension to prevent choking. The fastener parts also have a releasing lever and grip teeth to hold the cord end. Thus, the device has a second function of serving as a drawstring to adjust the length of the cord. The device is about ten times wider than the cord. It is, therefore, unsuitable for use inside a hood or in any unobtrusive application. Furthermore, the device is large enough to become a hazard itself in that it is prone to catch on things. It is also noted that two molds are needed to manufacture the product, one for the dovetail tongue, and one for the dovetail groove. Each mold would cost about $30,000.

The present invention is unobtrusive, small, and inexpensive. One mold creates one piece. It has one purpose, to act as a breakaway cord connector. Tongue and groove guide rails and a simple retainer boss provide for a secure, yet dependable, safety link for a thin cord. It has a torpedo like shape which enables it to slide through narrow passageways.

SUMMARY OF THE INVENTION

The main object of the present invention is to provide a reliable, unobtrusive breakaway cord connector for use on thin cords worn about the neck.

Another object of the present invention is to provide a low cost to manufacture device which is a one-piece plastic part used in pairs.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a side plan view of one breakaway part.

FIG. 2 is a longitudinal sectional view of the breakaway part in FIG. 1 taken along line 2—2 of FIG. 5.

FIG. 3 is a side plan view as in FIG. 1, but with the retainer arm closed and a cutaway of the cord slot.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Referring first to FIGS. 1,2 the nominal length of the connector body 1 is 0.750 inch, the nominal width of the cord 2 is 0.180 inch, the nominal height of the connector body 1 is 0.348 inch, and the nominal width of the connector body is 0.330 inch. All external surfaces of the connector body 1 are smoothed so as to allow the connector body 1 to slide inside garment passageways (not shown).

Figure 4:
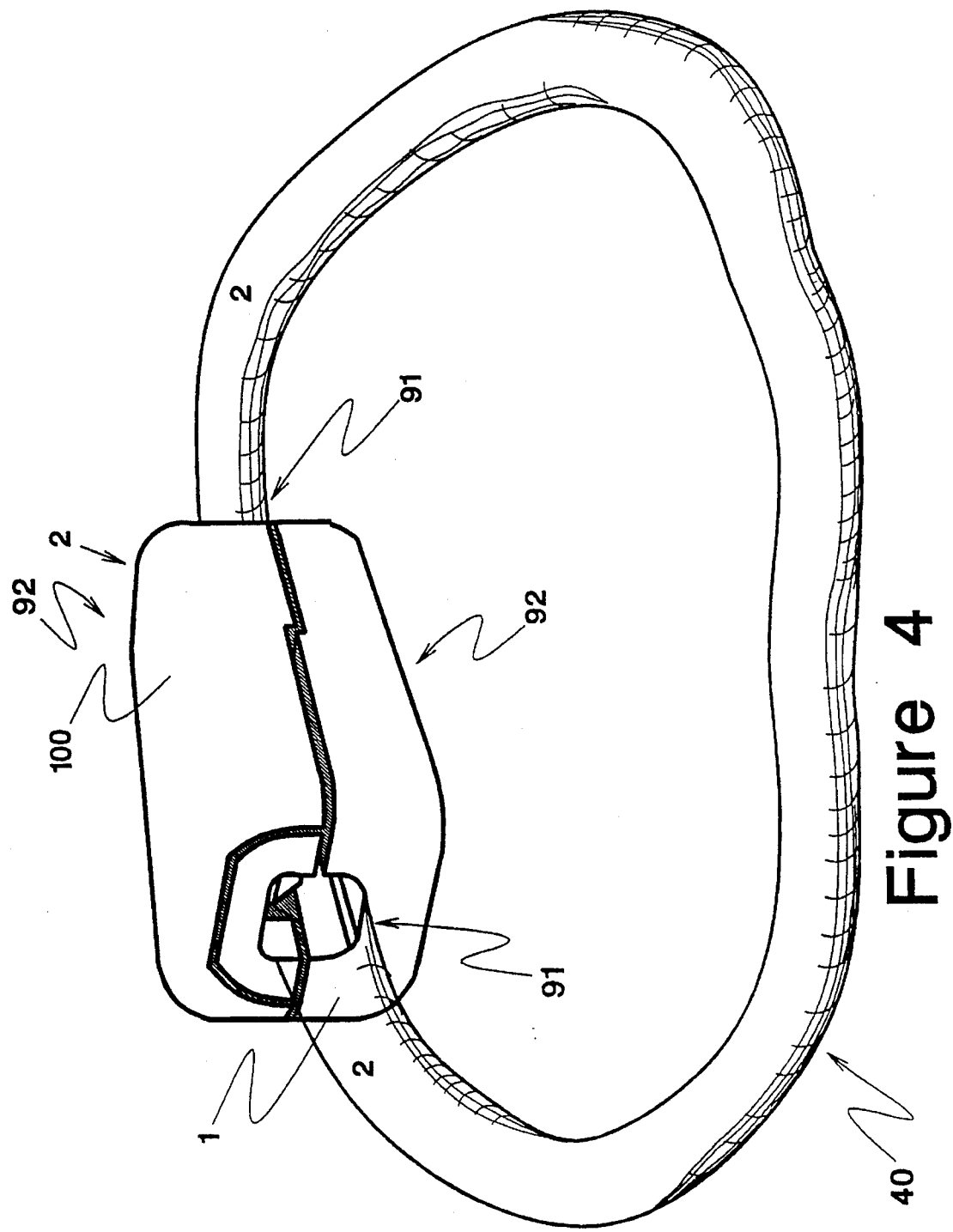
FIG. 4 is a top side perspective view of a pair of breakaway parts axially aligned, opposed, and inverted, thereby interlocking.
Figure 5:
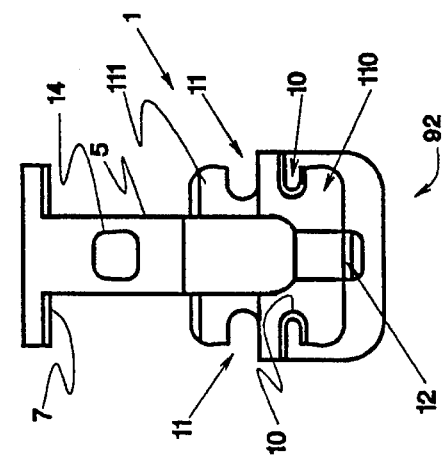
FIG. 5 is a front plan view of the breakaway part of FIG. 1.

In FIG. 4 it is shown that a pair of connector bodies 1,100, releasably engage in an axial alignment. Connector body 100 is axially rotated 180° relative to connector body 1. Also, cord ends 91 of cord 2 oppose one another. Mating ends 92 of the connector/cord sub-assemblies 1,2 and 100,2 mate in a releasable manner. The preferred embodiment of the present invention is composed of only one type of part, a connector body. Two of these identical connector bodies are required in the preferred embodiment. Therefore, the same numbers are used for the corresponding parts of multiple connector bodies shown together as in FIG. 4. For the purpose of this specification this type of body is called "self-mating."

Figure 7:
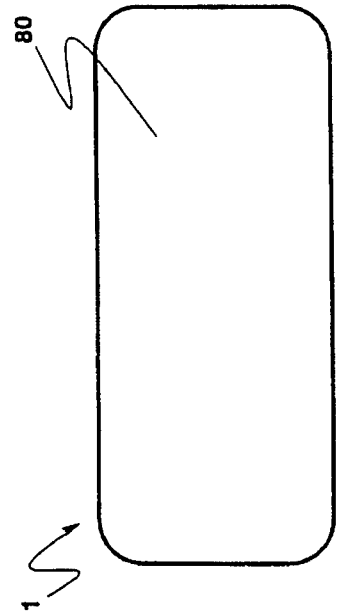
FIG. 7 is a front plan view of the breakaway part of FIG. 1 with the retainer arm in a closed position.
Figure 9:
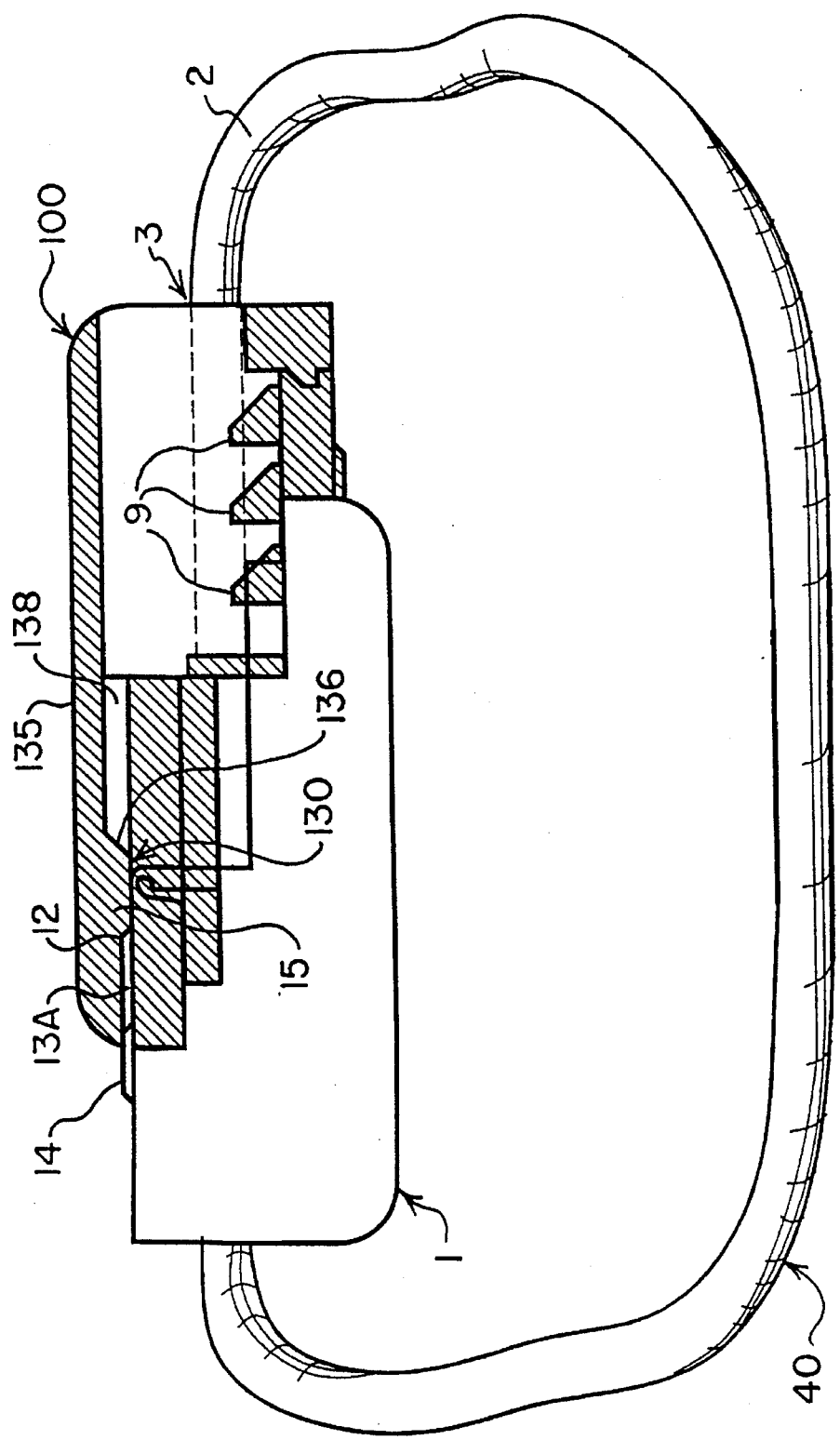
FIG. 9 is a side plan view of two breakaway parts partially engaged with a cutaway of one breakaway part.

Referring next to FIG. 3 a cord receiver slot 3 receives the cord 2 as best seen in FIGS. 2, 7, 9. The cord 2 is positioned against the terminus 4 of the cord receiver slot 3. To secure the cord 2 inside the cord receiver slot 3 the retainer arm 5 is folded downward around hinge 6 as shown in FIGS. 4, 9. The retainer arm 5 is held closed by the mirrored ramp 8 and clip 7. Clip 7 rotates about its hinge 70.

Three angular teeth 9 bite into the cord 2 when the retainer arm 5 is closed upon a cord 2 as seen in FIGS. 2, 4, 9. Thus, the connector 1 becomes secured to the end of cord 2. Although clip 7 could be raised to remove the cord 2, normal operation of the invention would not include this step.

Figure 6:
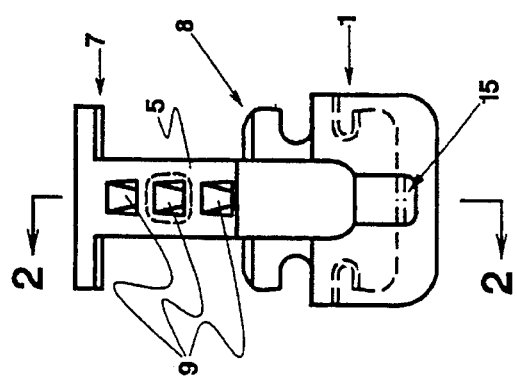
FIG. 6 is a back plan view of the breakaway part of FIG. 1.

Referring next to FIG. 6 the mating end 92 of connector body 1 is shown in a front plan view. Two connector bodies are mated by sliding tongue 10 into groove 11 where the bodies are 180° out of phase in a common axial plane. Thus, rail 111 slides into hollow track 110.

Referring next to FIG. 2, 9 once the cord 2 is secured in cord receiver slots 3, the two terminal/cord sub-assemblies are telescoped along their common longitudinal axis until contact is made between the angled terminus 12 and the retainer boss 14. FIG. 9 shows two breakaway parts partially engaged with a cutaway of one breakaway part. The angled terminus 12 is at the leading edge of the retainer catch 130 which is mounted on the retainer spring arm 135. The mating retainer boss 14 slides inside the retainer boss clearance slot 13A of the mating member.

The retainer boss 14 then travels up the angled terminus 12 and across the interference wall 15 of the retainer catch 130. The retainer boss 14 comes to rest inside clearance slot 13B. Referring again to FIG. 6 in addition to FIG. 9, the terminus 4 prevents the rail 111 from further telescoping at the time the retainer catch 130 snaps over the retainer boss 14. Two fully engaged breakaway parts, axially aligned, opposed and inverted are shown in FIG. 4.

It is understood that increasing the interference between the retainer boss 14 and the retainer catch 130 will increase the force required to disconnect the two terminal/cord sub-assemblies. The breakaway angle at surface 136 can be varied, the spring tension of the retainer spring arm 135 can be varied, and the size of the retainer boss 14 and retainer catch 130 can be varied. At some desired interference a resistive force will be attained to hold the sub-assemblies together under normal use yet disconnect before the cord breaks.

A secondary breakaway safety design is embedded in the preferred embodiment by allowing a preset shear force to be built into the angular teeth 9.

Thus, two mated sub-assemblies 1,100 as shown in FIG. 4 allows the closed cord loop 40 to hold up under normal work load conditions, yet provide a breakaway function should the loop 40 catch on a hazardous object.

Figure 8:
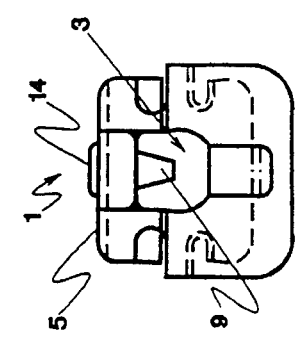
FIG. 8 is a bottom plan view of the breakaway part of FIG. 1.

Referring last to FIG. 8 the bottom surface 80 of connector body 1 is shown in plan view.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A breakaway cord connector assembly comprising:

a pair of duplicate elongate self-mating bodies;

said bodies having a cord end and a mating end;

said cord end having a clamp means to secure a cord end co-axially with the body;

said mating end having a means to telescopingly mate with the duplicate body co-axially;

said mating end further comprising a catch means to releasably secure a mirrored retainer catch means on the duplicate body, whereby the assembly comprising the mated pair of bodies affixed to the cord ends of a loop functions to breakaway at a preset force on the loop; and said means to telescopingly mate further comprises a self-mating mirrored tongue-in-groove design which mates with a duplicate member co-axially and 180° out of phase therewith.

2. The assembly of claim 1 wherein said clamp means further comprises a hinged retainer arm having teeth to bite a cord and a cord receiver slot.

3. The assembly of claim 2 wherein said hinged retainer arm further comprises the mirrored retainer catch means.

4. The assembly of claim 3 wherein said mirrored retainer catch means further comprises a projection facing away from the central axis of the soft-mating body.

5. The assembly of claim 4 wherein said catch means further comprises a projection on a retainer spring arm facing toward the central axis of the body, and said projection has a breakaway angle.

6. The assembly of claim 4 wherein said means to telescopingly mate further comprises a self-mating mirrored design to mate with a duplicate member co-axially and 180° out of phase therewith.

7. The assembly of claim 6 wherein said assembly has a height and a width of less than twice that of a cord connected to the assembly.

8. The assembly of claim 2 wherein said body further comprises a central terminus wall means functioning to stop the telescopic mating at a preset position when the catch means secures the retainer boss means, and functioning to provide an end for the cord receiver slot.

9. The assembly of claim 2 wherein said teeth have a preset shear force means to break off at a preset tension on a cord secured therein, thereby providing a secondary breakaway means.

10. A breakaway cord connector, comprising a cord;

a first and second cord connector body each having a cord receiver slot to receive said cord and a mating member;

said cord receiver slot further comprising a retainer arm;

said retainer arm further comprises a hinge around which said retainer arm releasably closes downward to secure said cord inside said cord connector body;

said first and second cord connector bodies oriented 180° out of phase in an axial alignment common to both said first and second cord connector bodies; and said mating member of said second cord connector body releasably engaging said mating member of said first connector body, whereby said first and second cord connector bodies disengage when said cord is subjected to a load greater than a preset work load;

said mating members are oriented on an end opposite of said cord receiver slot of said first and second cord connector bodies;

said mating members of said first and second cord connector bodies further comprise a sliding tongue and a groove; and said sliding tongue of said first cord connector body is engaged in said groove of said second connector body.

11. The connector of claim 10, further comprising a variable interference between said retainer boss and said retainer catch wherein said variable interference can be adjusted to hold said first and second cord connector bodies together under a preset work load but will provide a breakaway function should said cord catch on a hazardous object.

12. The connector of claim 11, wherein:

said mating members of said first and second cord connector bodies further comprise a retainer spring arm having a clearance slot;

said clearance slot further comprises a leading edge having a retainer catch said retainer spring arm of said first and second cord connector bodies further comprises a retainer boss; and said retainer boss of said second cord connector body slides into said clearance slot of said retainer spring arm of said first cord connector body whereby said first and second cord connector bodies are releasably engaged.

13. The connector of claim 12, wherein:

said retainer catch has a rear edge with a breakaway angle; and said variable interference between said retainer boss and said retainer catch can be adjusted by varying said breakaway angle.

14. The connector of claim 12, wherein:

said retainer spring arm further comprises a spring tension; and said variable interference between said retainer boss and said retainer catch can be adjusted by varying said spring tension of said retainer spring arm.

15. The connector of claim 12, wherein said interference between said retainer boss and said retainer catch can be adjusted by varying a size of said retainer boss and a size of said retainer catch.

16. The connector of claim 12, wherein said retainer arm further comprises a plurality of angular teeth whereby said plurality of angular teeth bite into said cord and hold said cord securely inside said cord connector body.

17. The connector of claim 16, wherein said plurality of angular teeth further comprise a preset sheer force whereby said plurality of angular teeth release said cord from said cord connector body when said cord is subjected to greater than said preset work load.

18. The connector of claim 17, wherein:

said retainer arm of said first and second cord connector bodies further comprises a first end and a second end;

said first end of said retainer arm further comprises a clip and said second end of said retainer arm further comprises said hinge; and said cord connector body further comprises a mirrored ramp whereby said retainer arm folds at said hinge and is held closed by engaging said clip on said first end of said retainer arm with said mirrored ramp.

* * * * *